United States Patent
Serabatir et al.

(10) Patent No.: US 8,667,957 B2
(45) Date of Patent: Mar. 11, 2014

(54) OVEN

(76) Inventors: Davut Ayhan Serabatir, Istanbul (TR); Ergin Arslan, Istanbul (TR); Ahmet Ali Uslu, Istanbul (TR); Mehmet Gocer, Istanbul (TR)

( * ) Notice: Subject to any disclaimer, the term of this patent is extended or adjusted under 35 U.S.C. 154(b) by 476 days.

(21) Appl. No.: 12/810,952

(22) PCT Filed: Nov. 27, 2008

(86) PCT No.: PCT/EP2008/066382
§ 371 (c)(1),
(2), (4) Date: Oct. 2, 2010

(87) PCT Pub. No.: WO2009/083361
PCT Pub. Date: Jul. 9, 2009

(65) Prior Publication Data
US 2011/0017193 A1    Jan. 27, 2011

(30) Foreign Application Priority Data
Dec. 28, 2007   (TR) .............. a 2007 09112

(51) Int. Cl.
*F24C 15/32* (2006.01)
*F01D 25/26* (2006.01)
*H02K 5/24* (2006.01)
*H02K 5/00* (2006.01)

(52) U.S. Cl.
USPC .............. 126/21 A; 126/21 R; 415/213.1; 310/51; 310/91

(58) Field of Classification Search
USPC .............. 126/21 A; 415/213.1; 310/51, 91
See application file for complete search history.

(56) References Cited

U.S. PATENT DOCUMENTS

| 4,161,667 A | | 7/1979 | Buckman et al. |
| 5,498,130 A | * | 3/1996 | Wakley et al. ............ 415/213.1 |
| 5,990,467 A | | 11/1999 | Yang et al. |

FOREIGN PATENT DOCUMENTS

| DE | 8604598 U1 | 7/1986 |
| DE | 8906272 U1 | 7/1989 |
| DE | 4326006 A1 | 2/1995 |
| DE | 10054955 A1 | 5/2002 |
| EP | 0948116 A | 10/1999 |
| EP | 1657495 A | 5/2006 |
| JP | 59027136 A | 5/1982 |
| JP | 60000225 A | 1/1985 |

* cited by examiner

*Primary Examiner* — Kenneth Rinehart
*Assistant Examiner* — William Corboy
(74) *Attorney, Agent, or Firm* — Venable, Campillo, Logan & Meaney PC

(57) ABSTRACT

The present invention relates to an oven (1) that comprises a heating chamber (2) wherein the cooking process is performed, a heater disposed inside and at the back side of the heating chamber (2), a rear wall (4) covering the rear side of the heating chamber (2), a fan motor (5) mounted outside the rear wall (4) for rotating the fan (3) in the heating chamber (2), a plate (6) secured outside the rear wall (4) for mounting the fan motor (5) outside the rear wall (4) and wherein the fan motor (5) vibrations transmitted to the heating chamber (2) is prevented by means of the leaf springs (8) disposed between the motor lugs (6) and the plate (6) and the fan motor (4) can be easily mounted and dismounted from the plate (6).

2 Claims, 3 Drawing Sheets

DETAIL D

OVEN

Figure 1:
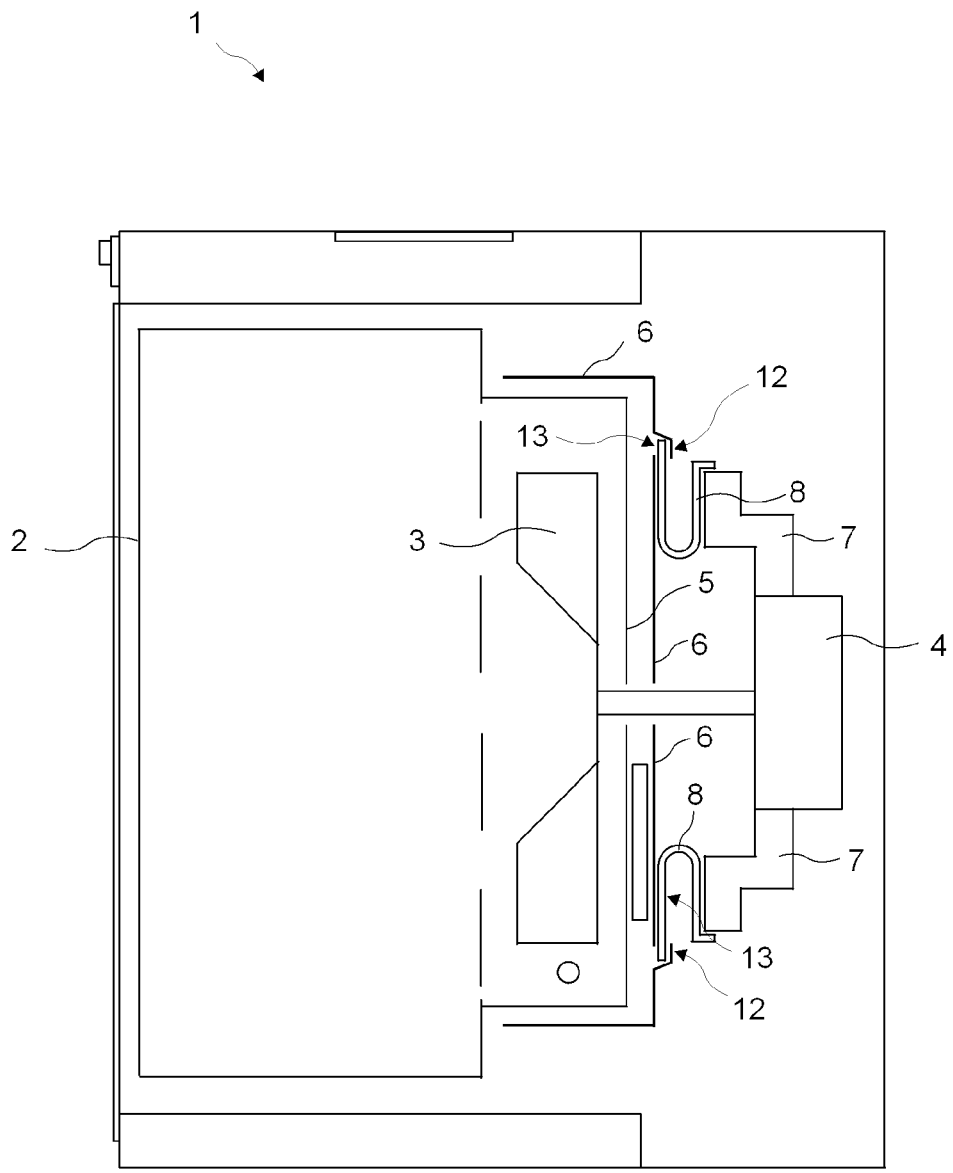

The present invention relates to an oven wherein the noise originating from the fan motor is reduced.

In domestic type ovens, for example in built-in ovens, fans are used for circulating the hot air in the heating chamber for maintaining homogeneous heat distribution and heat transfer by forced convection and to cool the electronic devices in the oven. The fan, circulating hot air in the heating chamber, is mounted on the rear wall of the cooking chamber situated in the main body of the oven, is driven by a fan motor and the high amplitude vibrations during the operation of the motor result in the generation of noise. The fan motor is secured on a motor plate fastened on the rear wall of the cooking chamber and the vibrational motion of the fan motor is transmitted to the motor plate and to the cooking chamber from there. The fastening elements such as bolts and nuts used in mounting the fan motor on the carrier plate become loose in time with the effect of heat and vibrations and cause the noise originating from the fan motor to increase.

In the state of the art Japanese patent document no JP60000225, a heating cooker is explained wherein the stability of the rotary body containing the food to be cooked thereon is improved against vibration and shock.

In the state of the art Japanese patent document no JP59027136, a heating cooker is explained wherein the noise generated by the fan motor is reduced. The fixing fitment, securing the fan motor is fixed to the rear wall of the insulating board through an elastic cushion provided with the space for absorbing the vibration.

In the state of the art United States of America patent document no U.S. Pat. No. 5,990,467, in a microwave oven, the explanation is given as to how the motor driving the blower for cooling the microwave devices is mounted on the rear panel of the body by means of a fixing rod.

The aim of the present invention is the realization of an oven wherein the noise originating from the fan motor circulating hot air is reduced.

The oven realized in order to attain the aim of the present invention is explicated in the claims.

The oven comprises a fan that circulates the hot air in the heating chamber wherein the cooking process is performed. The fan is driven by a motor mounted outside the rear wall of the heating chamber. The lugs supporting the motor are mounted to the plate that secures the fan motor and leaf springs are fastened between the fan motor lugs and the plate for dampening the vibrations. The leaf spring is configured by bending a metal strip in a U shape and fastened to the plate by means of a spring arm.

In the oven of the present invention the fan motor is mounted to the plate, with the leaf springs fastened under the motor lugs, rotating like a bayonet fitting, without using fastening elements such as bolts or nuts. The plate comprises slots for rotatably fitting therein the leaf springs under the motor lugs, where through the ends of the spring arms are inserted by stretching and locking holes through which the spring arms pass when opposite thereto by becoming free when bearing against the end of the slots.

The spring leaf furthermore comprises a set configured by bending the end of the spring arm that is fitted into the locking hole while the fan motor is mounted on the plate by rotating.

The plate furthermore comprises protuberances that extend towards the side the fan motor will be secured, high enough for the sets to go under, forming an entrance orifice for the spring arms to enter into the slot and go behind the plate, serving as a guide thereby helping the fan motor to be rotatingly mounted.

In the oven of the present invention, the vibrations transmitted from the fan motor to the plate and from the plate to the rear wall of the heating chamber are reduced and a fan motor connection is achieved by means of the slot, locking hole and protuberance configurations on the plate that do not become loose by time and without requiring the use of fastening elements such as bolts and nuts.

The oven realized in order to attain the aim of the present invention is illustrated in the attached figures, where:

FIG. 1—is the schematic view of an oven.

Figure 2:
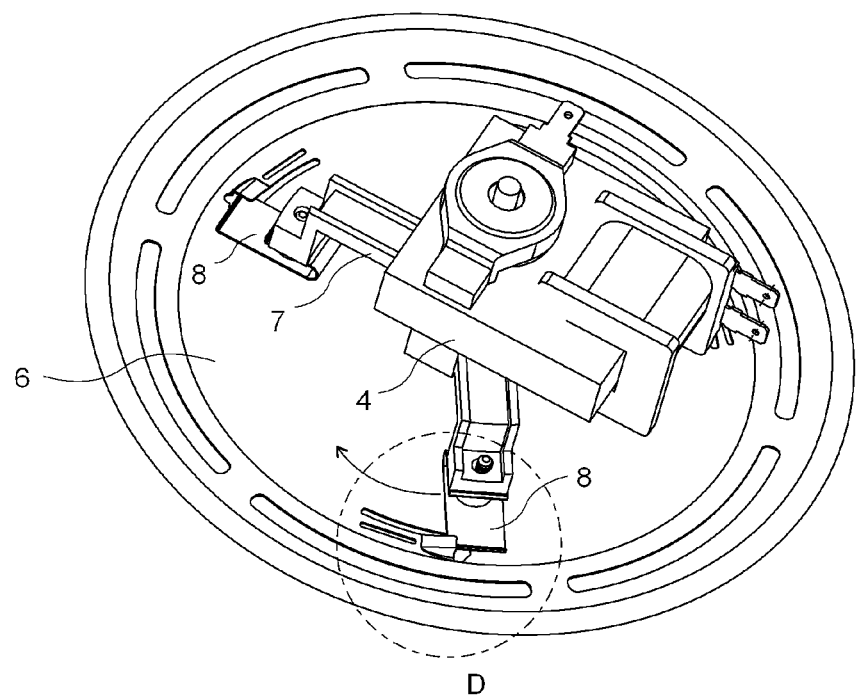

FIG. 2—is the perspective view of a plate and a fan motor mounted thereon by rotating.

Figure 3:
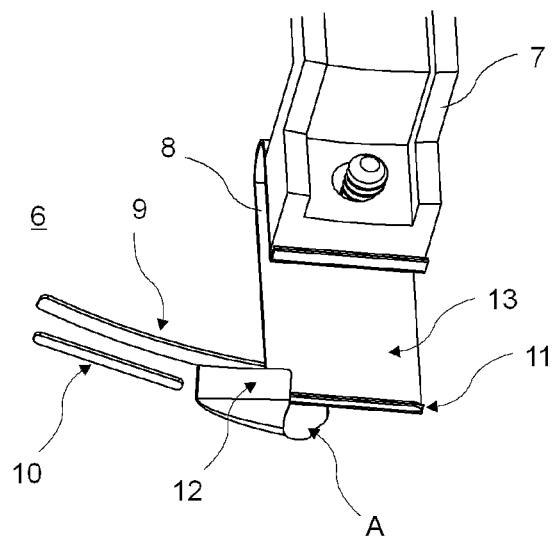

FIG. 3—is the perspective view of detail D in FIG. 2.

Figure 4:
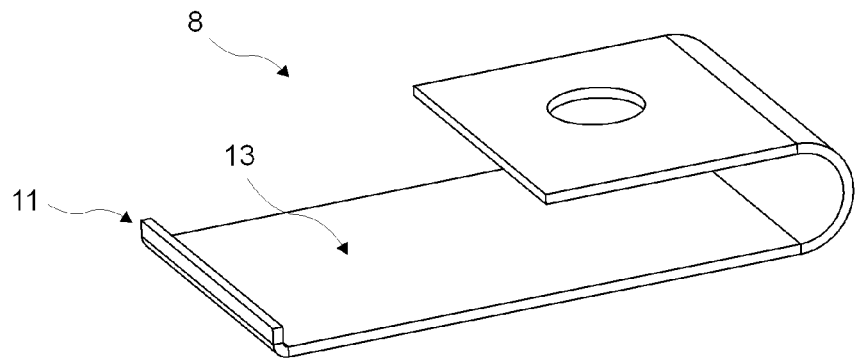

FIG. 4—is the perspective view of a leaf spring comprising a set on one end.

Figure 5:
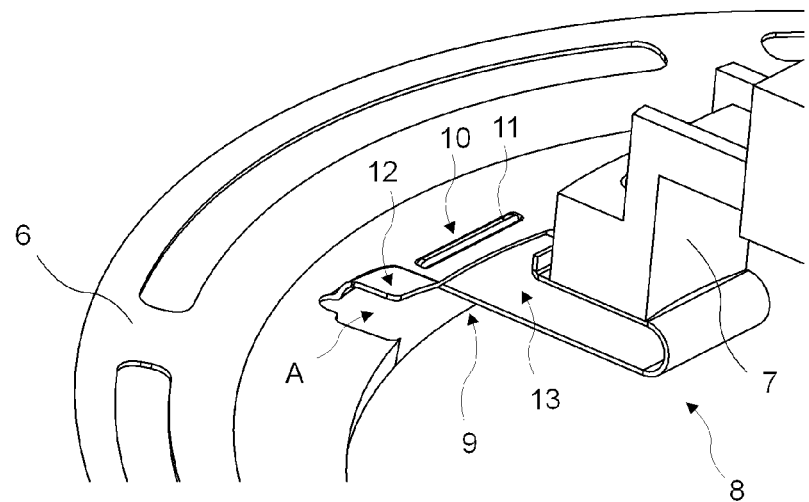

FIG. 5—is the detailed view of a leaf spring locked into the locking hole and the fan motor lug whereto the leaf spring is fastened.

The elements illustrated in the figures are numbered as follows:
1. Oven
2. Heating chamber
3. Fan
4. Fan motor
5. Rear wall
6. Plate
7. Lug
8. Leaf spring
9. Slot
10. Locking hole
11. Set
12. Protuberance
13. Spring arm The oven (1) comprises an outer body, a heating chamber (2) disposed inside the outer body and wherein the cooking process is performed, a heater situated in the heating chamber (2), a fan (3) for circulating the hot air in the heating chamber (2), a fan motor (4) actuating the fan (3), a rear wall (5) covering the rear side of the heating chamber (2), a plate (6) secured outside the rear wall (5), whereon the fan motor (4) is mounted, more than one lug (7) supporting the fan motor (4) and helping the assembly thereof on the plate (6), and more than one leaf spring (8) fastened between the lug (7) and the plate (6), having a spring arm (13) configured by bending a metal strip in U shape, for securing thereof to the plate (6), and dampening the vibrations of the fan motor (4) (FIGS. 1, 4).

The oven (1) of the present invention comprises
a plate (6), whereon the fan motor (4), with the leaf springs (8) secured under the lugs (7), is mounted by rotating, and
having more than one slot (9), configured as flat or curved, wherein the end of the spring arm (13) is fitted by stretching while the fan motor (4) is rotated during the assembly process, allowing the spring arm (13) to move therein and more than one locking hole (10), whereby the end of the spring arm (13) moving in the slot (9) becomes free when facing opposite thereof and is locked by fitting therein (FIGS. 2, 3, 5).

The fan motor (4) is mounted on the plate (6) by a fastening method such as bayonet fitting without using assembly elements such as bolts or nuts.

The leaf spring (8) comprises a set (11) configured by bending the end of the spring arm (13) that is seated on the plate (6) and is fitted into the locking hole (10) maintaining the leaf spring (8) to be locked to the plate (8) while the fan motor (4) is assembled on the plate (6) by rotating (FIG. 4).

In the embodiment of the present invention, after the leaf springs (8) are secured to the lugs (7) by fastening elements, the fan motor (4), with the leaf springs (8) fastened to the lugs (7) thereof, is placed on the plate (6) and the fan motor (4) is secured by rotating such that the sets (11) at the ends of the spring arms (13) are inserted into the locking holes (10) on the plate (6). The fan motor (4) is mounted on the plate (6) with a connection that is not affected from temperature and vibrations, without using assembly elements such as bolts or nuts that become loose by time, thereby providing ease of both mounting and dismounting.

The plate (6) furthermore comprises a protuberance (12) that extends towards the side the fan motor (4) will be secured, high enough for the set (11) to go under, forming an opening (A) for the end of the spring arm (13) to enter into the slot (9), allowing the end portion of the spring arm (13), together with the set (11) to pass through the slot (9) to go behind the plate (6) and serving as a guide while the fan motor (4) is rotatingly mounted on the plate (6) (FIGS. 3, 5).

While the fan motor (4) is rotatingly mounted on the plate (6), the set (11) at the end of the spring arm (13) passes through the opening (A) entering under the protuberance (12) and passes to behind the mounting plate (6). While the rotating motion of the fan motor (4) goes on, the portion of the spring arm (13) passing behind the plate (6) moves forward in the slot (9) by stretching a little and at a certain position, for example when the spring arm (13) bears against the end of the slot (9), the stretching of the spring arm (13) end stops and becomes free, and the sets (11) facing opposite the locking holes (10) are inserted into the locking holes (10) thereby securing the fan motor (4) on the plate (6).

In the oven (1) of the present invention, the vibrations transmitted from the fan motor (4) to the plate (6) and to the rear wall (5) of the heating chamber (2) from the plate (6) are reduced and improvement is provided in the noise originating from the fan motor (4) and a connection is provided that does not become loose in time, by means of the slots (9), where through the spring arms (13) pass, locking holes (10) and protuberances (12) on the plate (6), without requiring the use of fastening elements such as bolts and nuts.

The invention claimed is:

1. An oven (1) comprising a heating chamber (2) wherein the cooking process is performed, a fan (3) for circulating hot air in the heating chamber (2) having a rear side, a fan motor (4) actuating the fan (3), a rear wall (5) covering the rear side of the heating chamber (2), a plate (6) secured outside the rear wall (5), whereon the fan motor (4) is mounted, more than one lug (7) supporting the fan motor (4) and helping the assembly thereof on the plate (6), and more than one leaf spring (8) fastened between the lug (7) and the plate (6), having a spring arm (13) configured by bending a metal strip in U shape, for securing thereof to the plate (6), and characterized by the plate (6), whereon the fan motor (4), with the leaf springs (8) secured under the lugs (7), is mounted by rotating and having more than one slot (9), configured as flat or curved, wherein the end of the spring arm (13) is fitted by stretching while the fan motor (4) is rotated during the assembly process, allowing the spring arm (13) to move therein and more than one locking hole (10), whereby the end of the spring arm (13) moving in the slot (9) becomes free when facing opposite thereof and is locked by fitting therein and wherein the leaf spring (8) has a set (11) configured by bending the end of the spring arm (13) that is seated on the plate (6) and is fitted into the locking hole (10), maintaining the leaf spring (8) to be locked to the plate (6) while the fan motor (4) is rotatingly assembled on the plate (6) and wherein the plate (6) has a protuberance (12) that extends towards the side the fan motor (4) will be secured, high enough for the set (11) to go under, forming an opening (A) for the end of the spring arm (13) to enter into the slot (9), allowing the end portion of the spring arm (13), together with the set (11) to pass through the slot (9) to behind the plate (6) and serving as a guide while the fan motor (4) is rotatingly mounted on the plate (6).

2. An oven (1) for performing cooking comprising a heating chamber (2) having a rear side, a fan (3) for circulating hot air in the heating chamber (2), a fan motor (4) actuating the fan (3), a rear wall (5) covering the rear side of the heating chamber (2), a plate (6) secured outside the rear wall (5) for mounting the fan motor, more than one lug (7) supporting the fan motor (4) and for assembling the fan motor (4) on the plate (6), and more than one leaf spring (8) fastened between the lug (7) and the plate (6), having a spring arm (13) configured by bending a metal strip in U shape, and wherein the plate (6), having the fan motor (4) and the leaf springs (8) secured under the lugs (7), is mounted by rotating and having more than one slot (9) which is configured as flat or curved, and wherein the end of the spring arm (13) is fitted by stretching while the fan motor (4) is rotated during the assembly process, to allow the spring arm (13) to move therein and more than one locking hole (10), whereby the end of the spring arm (13) moving in the slot (9) becomes free when facing opposite thereof and is locked by fitting therein and wherein the leaf spring (8) comprises a set (11) configured by bending the end of the spring arm (13) that is seated on the plate (6) and is fitted into the locking hole (10), maintaining the leaf spring (8) to be locked to the plate (6) while the fan motor (4) is rotatingly assembled on the plate (6) and wherein the plate (6) comprises a protuberance (12) that extends towards the side the fan motor (4) will be secured, high enough for the set (11) to go under, forming an opening (A) for the end of the spring arm (13) to enter into the slot (9), allowing the end portion of the spring arm (13), together with the set (11) to pass through the slot (9) to behind the plate (6) and serving as a guide while the fan motor (4) is rotatingly mounted on the plate (6).

* * * * *